United States Patent
Choi et al.

(10) Patent No.: US 12,191,078 B2
(45) Date of Patent: Jan. 7, 2025

(54) TERNARY COMPOSITE MATERIAL, SUPERCAPACITOR, AND RELATED METHODS

(71) Applicant: Purdue Research Foundation, West Lafayette, IN (US)

(72) Inventors: Jong Hyun Choi, West Lafayette, IN (US); Duncan Neal Houpt, San Francisco, CA (US); Jaehoon Ji, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 209 days.

(21) Appl. No.: 18/063,998

(22) Filed: Dec. 9, 2022

(65) Prior Publication Data

US 2023/0187146 A1 Jun. 15, 2023

Related U.S. Application Data

(60) Provisional application No. 63/288,808, filed on Dec. 13, 2021.

(51) Int. Cl.
| | |
|---|---|
| *H01G 11/36* | (2013.01) |
| *C01B 32/16* | (2017.01) |
| *C01B 32/174* | (2017.01) |
| *H01G 11/32* | (2013.01) |
| *H01G 11/86* | (2013.01) |

(52) U.S. Cl.
CPC .......... *H01G 11/36* (2013.01); *C01B 32/16* (2017.08); *C01B 32/174* (2017.08); *H01G 11/32* (2013.01); *H01G 11/86* (2013.01)

(58) Field of Classification Search
None
See application file for complete search history.

(56) References Cited

U.S. PATENT DOCUMENTS

| | | | | |
|---|---|---|---|---|
| 2009/0272946 | A1* | 11/2009 | Lu | H01G 11/38 252/502 |
| 2012/0213995 | A1* | 8/2012 | Li | B82Y 40/00 977/762 |

FOREIGN PATENT DOCUMENTS

| | | | | |
|---|---|---|---|---|
| CN | 108630449 B | * 12/2019 | | H01G 11/26 |

OTHER PUBLICATIONS

Jian, et.al., "Designing a Carbon Nanotubes-Interconnected ZIF-Derived Cobalt Sulfide Hybrid Nanocage for Supercapacitors", J. Mater. Chem A, (2019), 7, pp. 1479-1490.

(Continued)

*Primary Examiner* — Eric W Thomas
(74) *Attorney, Agent, or Firm* — Hartman Global IP Law; Gary M. Hartman; Domenica N. S. Hartman

(57) ABSTRACT

Ternary composite material, electrode, supercapacitor, and related methods. A ternary composite material includes a scaffold formed of carbon nanotubes (CNT), a first layer of zeolitic imidazolate 8 (ZIF-8) crystals formed on the scaffold of the CNT, and a second layer of molybdenum disulfide (MoS2) flakes formed on the first layer of the ZIF-8 crystals. An electrode can be formed with the ternary composite. A supercapacitor may include one or more electrodes that are at least partly formed of the ternary composite material. Methods of producing the ternary composite material and the electrodes are also disclosed.

20 Claims, 8 Drawing Sheets

(56) References Cited

OTHER PUBLICATIONS

Jian, X. et al., "Flexible and Freestanding MoS2/rGO/CNT Hbrid Fibers for High-Capacity All-Solid Supercapacitors", Carbon 172 (2021) pp. 132-137.

Pandiyarajan, et al., "Designing an Interlayer-Widened MoS2-Packed Nitrogen-Rich Carbon Nanotube Core-Shell Structure for Redox-Mediated Quasi-Solid-State Supercapacitors", ACS Appl. Energy Mater. (2021), 4, pp. 2218-2230.

* cited by examiner

TERNARY COMPOSITE MATERIAL, SUPERCAPACITOR, AND RELATED METHODS

CROSS-REFERENCE TO RELATED APPLICATIONS

This application claims the benefit of U.S. Provisional Application No. 63/288,808; filed Dec. 13, 2021, the contents of which are incorporated herein by reference.

STATEMENT REGARDING FEDERALLY SPONSORED RESEARCH

This invention was made with government support under CMMI 1334088 awarded by the U.S. National Science Foundation. The government has certain rights in the invention.

BACKGROUND OF THE INVENTION

The present invention generally relates to supercapacitors, and more particularly to a ternary composite material that may be used in an electrode of a supercapacitor to promote performance thereof, and methods related thereto.

The demand for large capacitive and environmentally clean energy devices has rapidly grown for various applications ranging from large-scale power sources, such as those used in hybrid electric vehicles, to small-scale power sources, such as those used in portable gadgets. Among clean energy devices, supercapacitors have attracted significant attention due to their inherently large power density suitable for applications requiring a quick release of energy. Specifically, supercapacitors have large specific areas where a large amount of charge can be stored in an electrical double layer (EDL). Thus, they offer relatively high energy density, particularly compared to conventional electrostatic capacitors.

Energy density for currently available supercapacitors is relatively low compared to batteries. Attempts have been made to bridge this gap. For example, EDL-supercapacitors having carbon-based electrodes have been studied extensively due to their high electrical conductivity. However, carbon-based electrodes formed of materials such as graphite often have undesirable properties for high energy devices, such as relatively low porosity which may severely limit ion diffusion across the carbon-based electrode.

Various approaches have been proposed to overcome the limitations associated with carbon-based electrodes including, for example, carbon foam structures with micro-sized pores and carbon frameworks comprising of carbon nanotubes (CNT) and fibers. Preliminary studies have demonstrated that these pore-rich carbon structures can not only enhance ion diffusion sufficient to improve scan rates, but also have larger surface areas that promote ion adsorption/desorption. While these approaches provide possible avenues for increased energy density of supercapacitors (up to about 10 Wh/kg), supercapacitors with these components have not reached the energy densities of batteries (about 150 Wh/kg).

Another approach to improve the performance of carbon-based supercapacitors has been the development of metal-organic frameworks (MOFs) as a supporting material for electrodes. Thus far, experimental MOFs have been produced with several desirable features for energy storage, such as high specific surface areas and a wide range of pore sizes. In one example of such MOFS, zeolitic imidazolate frameworks (ZIFs) have been produced with hierarchical structures that allow for various morphologies and uniformly distributed mesopores which may have the potential to be optimized to promote high ion diffusivity. Although typical pristine ZIFs are inherently non-conducting materials that cannot efficiently collect charges as an electrode, ZIFs may be combined with certain conducting materials such as CNT or conductive polymers to produce a conductive framework that may be suitable for supercapacitor electrodes. For example, nano-caged CNT-ZIF-67 structures have been observed to provide an energy density of about 23.3 Wh/kg at a power density of about 3380 W/kg with 96.6% retention after 5,000 cycles. Similarly, a CNT-ZIF-8 framework synthesized with polyaniline was observed to provide an energy density of approximately 29 Wh/kg at 759.4 W/kg. The performances of these CNT-ZIF composite electrodes represent a significant improvement relative to electrodes comprising only carbon-based structures, and CNT-ZIF composite materials have shown considerable promise for use in electrodes for EDL-supercapacitors. However, supercapacitors comprising these materials still provide energy densities far below those of batteries, thereby limiting the practical implementation of these materials into large capacitive and environmentally clean energy devices.

In view of the above, it can be appreciated that there is an ongoing desire to continue to improve the energy densities of supercapacitors.

BRIEF DESCRIPTION OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides ternary composite materials, supercapacitors comprising the same, and methods for producing the ternary composite materials and supercapacitors that promote improved performance relative to certain existing supercapacitors and materials used therein.

According to one aspect of the invention, a ternary composite material is provided. The ternary composite material includes a scaffold formed of carbon nanotubes (CNT), a first layer of zeolitic imidazolate 8 (ZIF-8) crystals formed on the scaffold of the CNT, and a second layer of molybdenum disulfide (MoS2) flakes formed on the first layer of the ZIF-8 crystals. The ZIF-8 crystals are thiolated. Sulfur vacancies of the MoS2 flakes are bound to thiol group binding sites of the ZIF-8 crystals.

According to another aspect of the invention, a supercapacitor is provided. The supercapacitor includes one or more electrodes that are at least partly formed of the ternary composite material.

According to yet another aspect of the invention, a method of producing the ternary composite material is provided. The method includes providing the CNT, synthesizing the layer of the ZIF-8 on the CNT to form a binary composite material, and reacting the binary composite material with the $MoS_2$ flakes to form the ternary composite material.

According to yet another aspect of the invention, a method of producing electrodes of a supercapacitor is provided. The method includes producing a thin film of the ternary composite material, depositing the thin film on a substrate with a conductive epoxy thereon, and curing the epoxy, thereby securing the thin film on the substrate.

Technical effects of the ternary composite material, the supercapacitor, and the methods described above preferably include the ability to provide improved supercapacitor-based energy devices and other devices using the ternary composite material to promote, in part, high energy density.

Other aspects and advantages of this invention will be appreciated from the following detailed description.

DETAILED DESCRIPTION OF THE INVENTION

Figure 1:
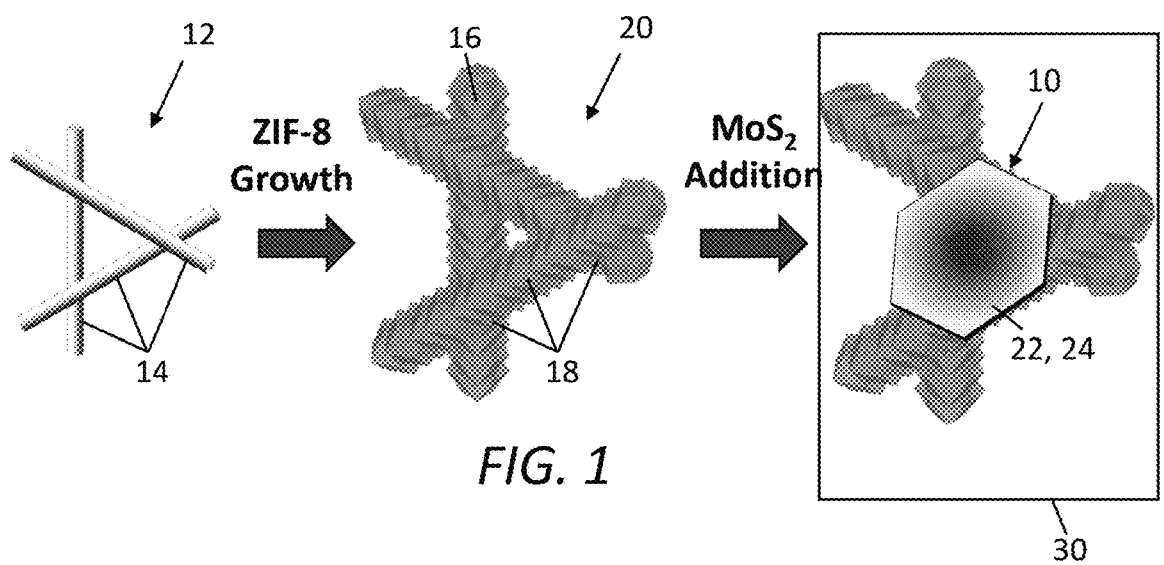
FIG. 1 schematically represents CNT-ZIF-MoS$_2$ electrode synthesis according to certain aspects of the present invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) to which the drawings relate. The following detailed description also describes certain investigations relating to the embodiment(s) depicted in the drawings, and identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

According to some aspects of the disclosure, composite materials are provided that integrate CNT-ZIF composites with transition metal dichalcogenides (TMDs). A TMD is a metal atom sandwiched by two chalcogens that, in combination, form a layered structure via van der Waals interaction. Specifically, disclosed herein is a ternary composite material 10 that includes a CNT-ZIF-molybdenum disulfide (MoS$_2$) hybrid framework. The ternary composite material may be used to produce highly durable supercapacitors with high energy and power densities.

As illustrated in FIG. 1, to exploit the unique properties of the three materials, CNT, ZIF, and MoS$_2$, in accordance with certain aspects of the present invention, percolated CNT networks are first coated with a dopamine layer that provides nucleation sites for the growth of ZIF. ZIF crystals cover the CNT frameworks and bind with MoS$_2$ flakes, forming a full composite electrode 30 made of a ternary composite material 10. For example, a scaffold 12 formed of carbon nanotubes (CNT) 14 is provided. A layer 16 of zeolitic imidazolate 8 (ZIF-8) crystals 18 is formed, for example synthesized, on the scaffold 12 of the CNT 14 to form a binary composite material 20. Thereafter, a layer 22 of molybdenum disulfide (MoS$_2$) flakes 24 is formed on the layer 16 of the ZIF-8 crystals 18. For example, the binary composite material 20 is reacted with the MoS$_2$ flakes 24 to form the ternary composite material 10. The ZIF-8 crystals 18 are thiolated, and sulfur vacancies of the MoS$_2$ flakes 22 are bound to thiol group binding sites of the ZIF-8 crystals 18.

The CNT 14 may be prepared by a high-pressure, gas-phase decomposition of CO (HiPco) process. The CNT 14 may be reacted with dopamine hydrochloride to form CNT-dopamine complexes. Synthesizing the layer 16 of the ZIF-8 crystals 18 on the CNT 14 may be done by combining the CNT-dopamine complexes, dimethylformamide (DMF), zinc chloride, and 1h-1,2,4-triazole-3-thiol in a mixture. The mixture may be heated for a time sufficient to form the layer of the ZIF-8 crystals 18 on the CNT 14 of the scaffold 12. The MoS$_2$ flakes 24 may be produced by sonicating bulk MoS$_2$ crystals in DMF.

According to some aspects of the disclosure, a hybrid framework for synergetic effects of hetero-materials is provided to improve the performance of supercapacitors. A composite electrode 30 is formed of carbon nanotubes (CNT) with high conductivity, a zeolitic imidazole framework (ZIF) allowing a fast ion diffusion, and molybdenum disulfide (MoS$_2$) bearing a large ion capacity. The composite electrode 30 demonstrates exceptional performances, with a specific capacitance over 262 F/g and an energy density of ~52.4 Wh/kg at a scan rate of 20 mV/s while keeping a high power density (~3680 W/kg at a scan rate of 100 mV/s). Kinetics analysis reveals that the multi-component composite electrode 30 behaves as a hybrid supercapacitor storing energy by not only fast capacitive processes, but also faradaic reactive processes. The CNT-ZIF-MoS$_2$ composite electrode 30 demonstrates remarkable durability with outstanding capacitance retention over 10,000 charge-discharge cycles. The ternary composite material 10, composite electrode 30, and superconductor may have particular application in designing hybrid materials for high-performance supercapacitor devices with an ultralong life span.

A ternary CNT-ZIF-MoS$_2$ hybrid framework according to aspects of the present invention provides a highly durable supercapacitor with improved energy and power densities. In the disclosed framework, the CNT 14 serve as a stable scaffold 12 wrapped by ZIF-8 crystals (Zn$_6$(2-methylimidazole)$_{12}$) 18 that bind with exfoliated MoS$_2$ layers 22. The percolated CNT network 12 provides current pathways with high conductivity, which is also beneficial in increasing the rate capability. The intermediate ZIF layer 16 increases specific area and ion diffusivity due to its hierarchical porous structure.

To construct a stable composite, thiolated ZIF is provided that includes binding sites for the MoS$_2$ layer 22 that further enhance the ion capacity of the supercapacitor. Thiol groups can interact with the sulfur vacancies in MoS$_2$, which is stronger than the van der Waals interaction. With the synergetic effects of the hetero-materials, supercapacitors formed by the electrodes 30 with the framework have been observed to provide surprising improvements to performance, such as having a specific capacitance of about 262 F/g, an energy density of about 52.4 Wh/kg measured at a scan rate of 20 mV/s, and a power density of about 3680 W/kg under 100 mV/s.

Investigations leading to certain aspects of the invention relating to the electrochemical kinetics of this framework indicated that the energy storage mechanisms include both surface-controlled capacitive and diffusion-controlled redox processes with nearly equal contributions at a scan rate of 100 mV/s. Remarkably, supercapacitors made with the framework were observed to retain a specific capacity of about 90 percent over 50,000 cycles, demonstrating excellent charging-discharging durability for a long-term usage.

Methods and materials employed in the investigations leading to the present invention(s) are described hereinafter. Experimental results and a discussion of several aspects of the invention are then described. While the inventors may theorize as to why certain phenomena may or may not occur relative to the investigations for the purpose of disseminating knowledge, the invention is not to be limited to any of such theories.

The ternary composites 10 were produced by synthesizing the ZIF-8 structure 16 on single-walled CNT 14. The nanotubes 14 were prepared by a high-pressure, gas-phase decomposition of CO (HiPco) process. Approximately 5 mg of CNT bundles was dispersed in 20 ml of ethanol and 15 ml of water by using a tip sonication method. Subsequently, dopamine hydrochloride was added to the CNT solution at a mass ratio of 10:1 (dopamine: CNT) along with 10 ml of tris-(hydroxymethyl)-aminomethane aqueous solution (25 mM). Dopamine provided nucleation sites that facilitate the formation of ZIF 18 on the CNT surfaces. This mixture was allowed to react for two hours and centrifuged to separate CNT-dopamine complexes from the liquid. The complexes were then re-dispersed in 24 ml of dimethylformamide (DMF) using the tip sonication for 30 minutes. The exchange of the solvent was performed because DMF allowed for a stable synthesis of ZIF. Approximately 15 mg of zinc chloride and 30 mg of 1h-1,2,4-triazole-3-thiol were added to the solution. This mixture was heated in a convection oven for 48 hours at 120° C. for a complete formation of the ZIF-8 crystals 18. The ZIF-8 crystals were used not only for fast ion diffusivity, but also for excellent thermal and alkaline stabilities, which are desirable characteristics for the material of supercapacitor electrodes.

MoS$_2$ flakes 24 were prepared by sonicating 6 mg of bulk MoS$_2$ crystals in 6 ml of DMF for one hour. This MoS$_2$ solution was incubated with the CNT-ZIF mixture for 24 hours at 80° C. to promote the covalent reaction between MoS$_2$ and ZIF. The synthesis process is represented in FIG. 1. The mass ratios between the constituent materials were adjusted in an attempt to achieve the highest energy density (vide infra). Additionally, CNT-MoS$_2$ composites were prepared by mixing the dispersed CNT with the chemically exfoliated MoS$_2$ in DMF as a control sample to examine the effect of ZIF.

Supercapacitor electrodes 30 were prepared via a two-step membrane filtration and transfer processes. About 3 ml of the CNT-ZIF-MoS$_2$ solution was vacuum-filtrated on a porous polytetrafluoroethylene (PTFE) membrane. The liquid diffused through the membrane, while the composites 10 were deposited on top of the membrane by forming a thin film with an area of about 1 cm$^2$. To remove impurities, the sample was washed with an excessive amount of ethanol and water, and baked at 110° C. overnight. The film was redeposited on a small piece of nickel foam with conductive silver-epoxy, where the epoxy was cured at 70° C. for 20 minutes. Other electrodes, including bare CNT, CNT-ZIF, and CNT-MoS$_2$, were also prepared with the same method to compare the electrochemical performances.

The morphologies of the electrodes were observed with scanning electron microscopy (Hitachi S-4800 Field Emission SEM) at 5 kV. Raman characteristics of the samples were investigated with a Renishaw confocal microscope using a 785 nm laser under ambient conditions. The MoS$_2$ flakes were examined by atomic force microscopy (AFM).

The charge storage behaviors of the electrodes were monitored in a three-electrode test cell. The synthesized materials served as a working electrode, while a platinum-coated glass slab was utilized as a counter electrode. An Ag/AgCl electrode was used with 3 M KCl to reference the working electrode. These electrodes were submerged in a freshly prepared 6 M KOH electrolyte by dissolving bulk KOH pellets in deionized water. The Ag/AgCl reference electrode was stable in the investigations without any fluctuations of the referenced potential for the performance measurements and the durability tests. The currents were measured by sweeping the potential of the electrochemical cell relative to the reference electrode between 0 and −1.2 V at various scan rates, including 20, 50, and 100 mV/s. Based on the current-voltage response, the specific capacitance, energy, and power of the cell were estimated from the following equations:

$$C = \frac{1}{mv\Delta V}\int_0^{\frac{2\Delta V}{v}} IdV \qquad \text{Eq. (1)}$$

$$E = \frac{C\Delta V^2}{2} \qquad \text{Eq. (2)}$$

$$P = \frac{E}{\Delta t} \qquad \text{Eq. (3)}$$

where C (F/g) is the specific capacitance of the electrode, m (g) is the total mass of the working electrode material, v (V/s) is the scan rate of the cyclic voltammetry, and ΔV (V) represents the voltage window of the test. The integration indicates the enclosed area of the current-voltage profile. Δt (s) is the total time of the experiment. E (Wh/kg) and P (W/kg) are the specific energy and power, respectively.

Results of the experiments leading to this disclosure are described below.

To examine the topologies of the hetero-materials, three films were prepared representing each stage of the electrode synthesis: unmodified CNT, CNT-ZIF, and CNT-ZIF-MoS$_2$.

Figure 2A:
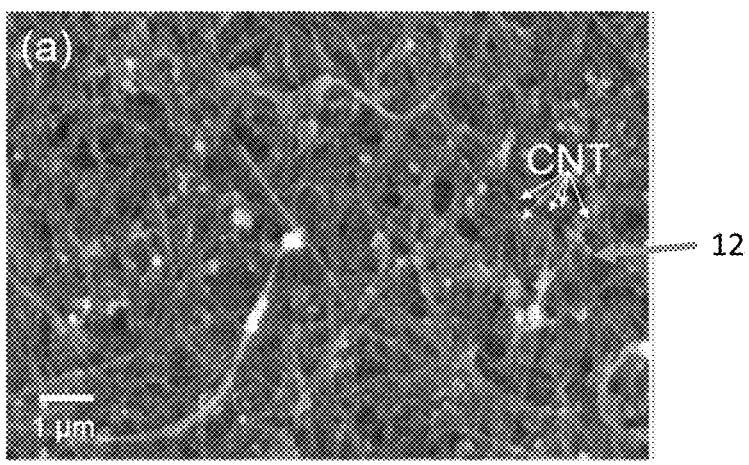
FIGS. 2A-2C include SEM images of CNT (FIG. 2A), CNT-ZIF (FIG. 2B), and CNT-ZIF-MOS$_2$ (FIG. 2C).
Figure 2B:
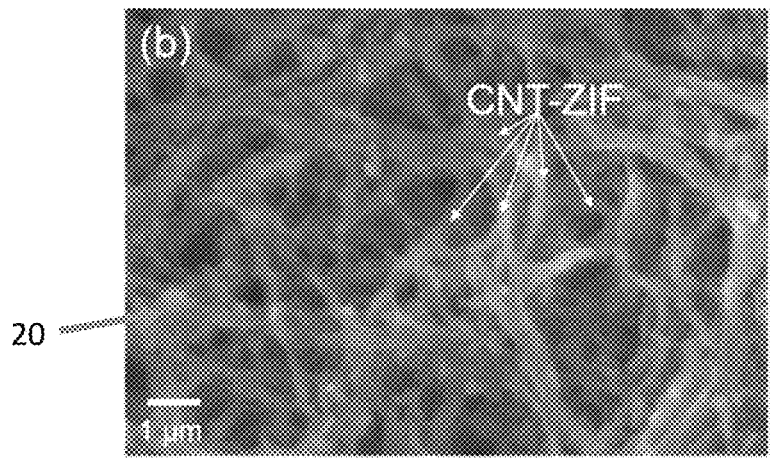
Figure 2C:
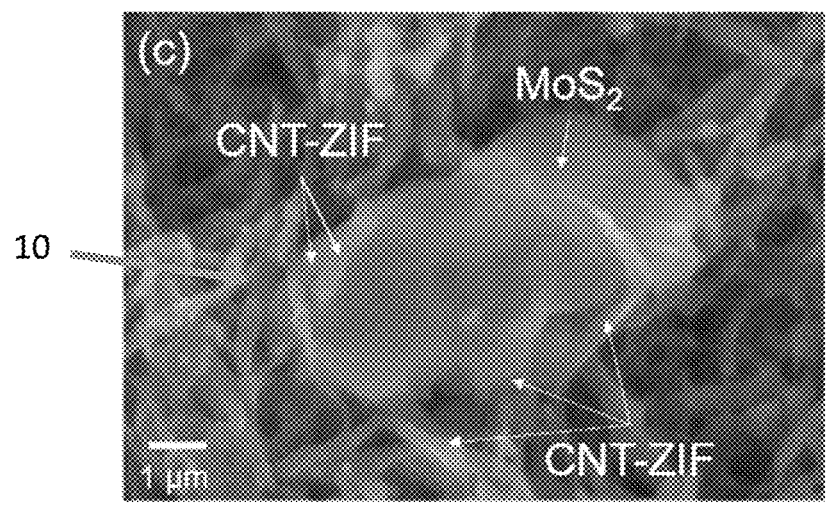

FIGS. 2A-2C show the SEM images of surface morphologies of the materials, in which representative sites showing each structure are marked with white arrows. The bare CNT sample (FIG. 2A) shows thin tubes with a diameter ranging from 0.92 to 1.23 nm. The ZIF-surrounded CNT (FIG. 2B) exhibit significantly larger diameters (over 160 nm). The final composite (FIG. 2C) contains $MoS_2$ flakes binding with CNT-ZIF structures. As seen in FIG. 2A, the CNT 14 formed a densely packed percolated network 12, serving as the conductive framework of the electrode. Due to the extremely small diameters of CNT (about 1 nm), the nanotubes appear as long and thin lines in the image. In FIG. 2B, the CNT-ZIF 20 sample shows significantly thicker tubes with a diameter of over 160 nm. The ZIF was uniformly distributed on CNT forests without any significant voids, confirming the successful synthesis of ZIF. FIG. 2C presents the morphology of the CNT-ZIF-$MoS_2$ film 10. A micron-size $MoS_2$ flake 24 appears in the middle of the image, where the tubular structures appear to be attached mostly at the edges of the flake. This may have been attributed to the fact that the $MoS_2$ edges include more vacancy sties than the basal plane. The thiolated ZIF-CNT may covalently bind to the vacancies via sulfide bonding. AFM imaging suggested that the $MoS_2$ flakes were 6 to 20 layers thick on average.

Figure 2D:
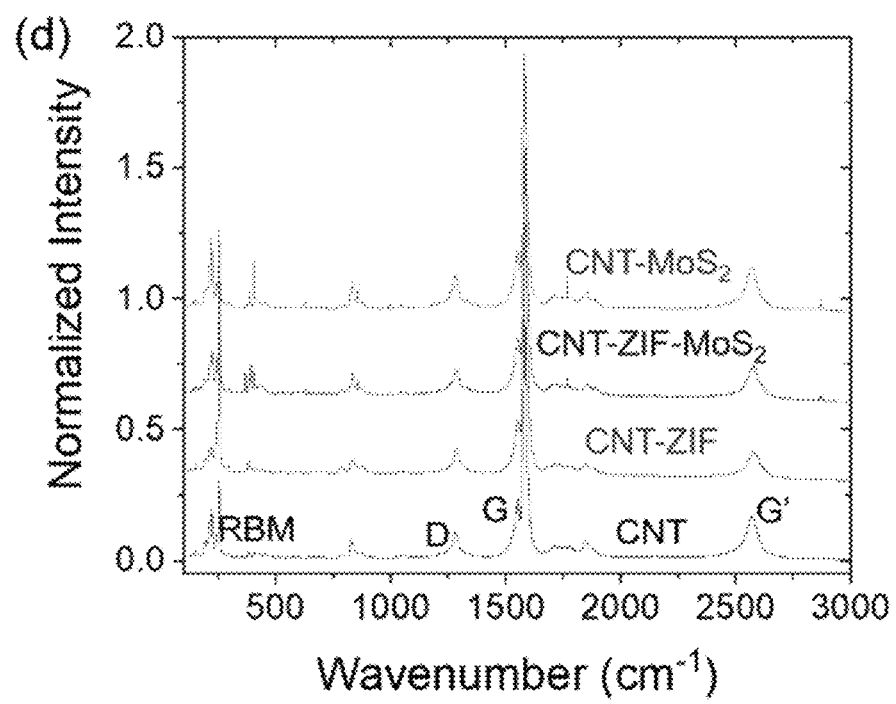
FIG. 2D is a graph representing Raman spectra of CNT, CNT-ZIF, CNT-ZIF-MoS$_2$, and CNT-MoS$_2$.
Figure 2E:
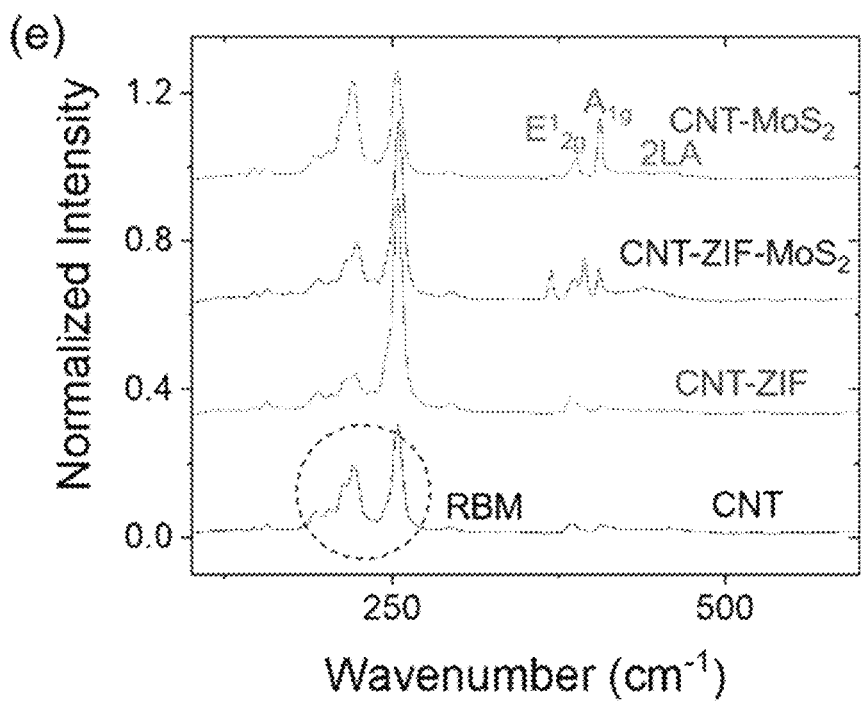
FIG. 2E is a graph representing the Raman spectra of FIG. 2D enlarged in low wavenumbers.

FIGS. 2D and 2E show measurements of Raman signatures of the composites shown in FIGS. 2A-2C. The CNT-containing samples show Raman signatures, including G, D, and G' bands as well as RBM. The samples including $MoS_2$ flakes show distinct out-of-plane ($A_{1g}$) and in-plane ($E^1_{2g}$) vibration signatures of the TMD plates. The CNT film includes distinct peaks at about 1583 and about 1280 $cm^{-1}$ corresponding to the G-band and D-band, respectively. The G-band arises from the tangential stretching of the graphitic carbon structure. The D-band represents the disordered, $sp^3$-hybridized carbon atoms associated with defects and impurities. The peak intensity ratio (D/G) was computed to measure the degree of disorder. The bare CNT sample showed a D/G of about 0.11, indicating a low defect level. Other peaks were also observed at approximately 2570, 830, and 250 $cm^{-1}$ wavenumbers. The former is known as G'-band, which is a secondary over-tune of carbon-based hexagonal structure. The features near 830 $cm^{-1}$ were intermediate frequency modes. The multiple Raman peaks at the low wavenumbers represent radial breathing modes (RBMs) of CNT, which resulted from the oscillating circumference of the nanotube in the radial direction. From the RBMs, it was estimated that the CNT diameters ranged from 0.92 to 1.23 nm.

Other CNT-containing composites, including CNT-ZIF, CNT-ZIF-$MoS_2$, and CNT-$MoS_2$, exhibited different features as well as similar characteristics. ZIF-applied composites show the G- and D-bands at approximately 1585 and 1284 $cm^{-1}$, respectively. The peaks are shifted to higher wavenumbers by about 3 $cm^{-1}$ compared to the unmodified CNT sample, which may have been attributed to the residual stresses on the CNT by wrapping with ZIF crystals. CNT-ZIF and CNT-ZIF-$MoS_2$ films display a similar D/G ratio (about 0.13). This suggested that the CNT crystallinity was well preserved regardless of the functionalization with ZIF and ZIF-$MoS_2$. Thus, the conductivity of CNT should not be severely deteriorated during the synthesis. Interestingly, the CNT-$MoS_2$ sample without ZIF demonstrated the G- and D-bands at the same wavenumbers compared to the bare CNT sample. The sample also showed a similar D/G ratio (about 0.14), suggesting that CNT and $MoS_2$ were bound via the weak van der Waals interaction.

The vibration modes of $MoS_2$ were also compared. The bare $MoS_2$ film exhibited in-plane vibration ($E^1_{2g}$) and out-of-plane mode ($A_{1g}$) at approximately 388 and 405 $cm^{-1}$, respectively. The peak position difference between the two Raman modes was around 17 $cm^{-1}$. Both CNT-$MoS_2$ composites with and without ZIF exhibited $E^1_{2g}$ and $A_{1g}$ peaks at the same wavenumbers in the control $MoS_2$. However, the relative peak intensity between $E^1_{2g}$ and $A_{1g}$ was different in the composites. While the CNT-$MoS_2$ without ZIF showed a greater intensity of $A_{1g}$ than $E^1_{2g}$, the CNT-ZIF-$MoS_2$ composite 10 demonstrated similar intensities. In the full ternary composite 10, the $MoS_2$ layer 22 binds covalently with the ZIF structure 16, which may suppress the out-of-plane Raman mode.

Figure 3A:
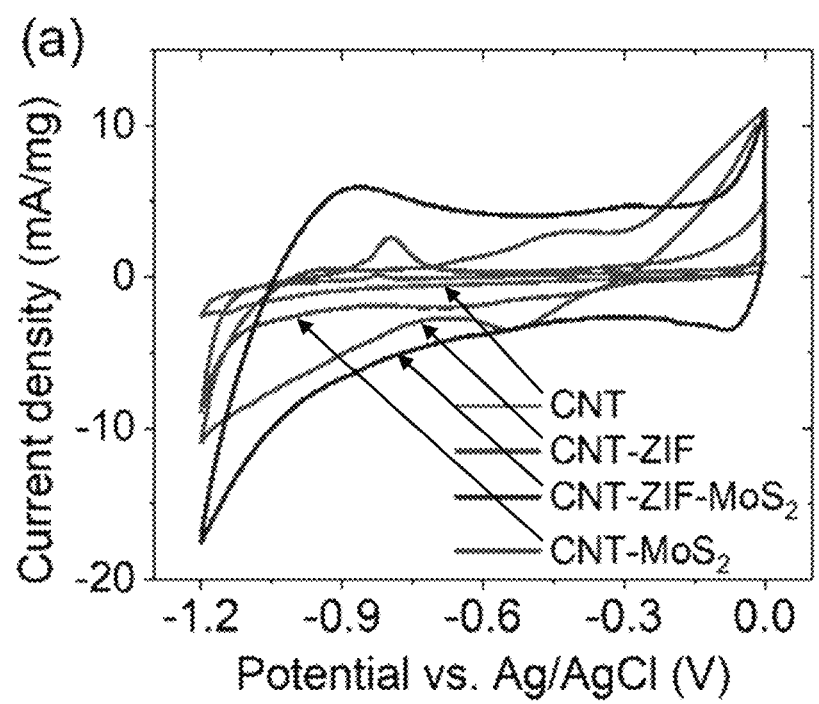
FIG. 3A graphically represents cyclic voltammetry (CV) of CNT, CNT-ZIF, CNT-ZIF-MoS$_2$, and CNT with MoS$_2$.

The energy storage characteristics of the hetero-material electrodes were evaluated by cyclic voltammetry (CV) using a three-electrode system as described above. To confirm the functions and benefits of three distinct materials, four electrodes made of CNT, CNT-ZIF, CNT-ZIF-$MoS_2$, and CNT-$MoS_2$ were examined. The measurements were performed at a scan rate of 20 mV/s in 6 M KOH electrolyte solution unless noted otherwise. FIGS. 3A-3F show graphic plots of data from these measurements related to electrochemical characterization of the various electrode materials tested. FIG. 3A demonstrates CV profiles of the four electrodes in 6 M KOH solution at 20 mV/s. As seen in FIG. 3A, the full composite electrode (CNT-ZIF-$MoS_2$) exhibits the largest area of the CV profile. The pure CNT-based electrode showed the smallest area with a specific capacitance of about 17 F/g, where the specific capacitance was computed based on equation (1). Cathodic/anodic peaks from the faradaic reaction between the electrode and potassium ions were observed at around-0.8 V. The CNT-ZIF sample demonstrated a significantly improved specific capacitance (about 125 F/g). The enhanced performance may have been attributed to the nature of ZIF providing a high ion diffusivity due to the porous structure. The CV area of the full ternary composite was the largest with the highest specific capacitance over 260 F/g at 20 mV/s, which was doubled from that of the CNT-ZIF sample. The improved capacitance may originate from the increased ion capacity of the electrode offered by the $MoS_2$ layer with highly conductive CNT and ion-diffusive ZIF structures.

The CNT-ZIF-$MoS_2$ electrode 30 showed a semi-rectangular profile. This suggested that the energy was stored via both pseudo-capacitive (faradaic reactive) and surface-controlled (adsorption/desorption of ions at the electrode surface) processes. The CV response of CNT-$MoS_2$ further supported the advantages of integrating the hetero-materials. The CV area was four times smaller with a specific capacitance of about 65 F/g than the full ternary composite. Without ZIF, the electrode may have limited ion diffusion and weak van der Waals interaction between CNT and $MoS_2$, resulting in the low capacitance. It was concluded that the energy capacity of the supercapacitor may be boosted by the proper combination of the hetero-materials, where each material offers unique benefits to enhance the electrochemical performance.

Figure 3B:
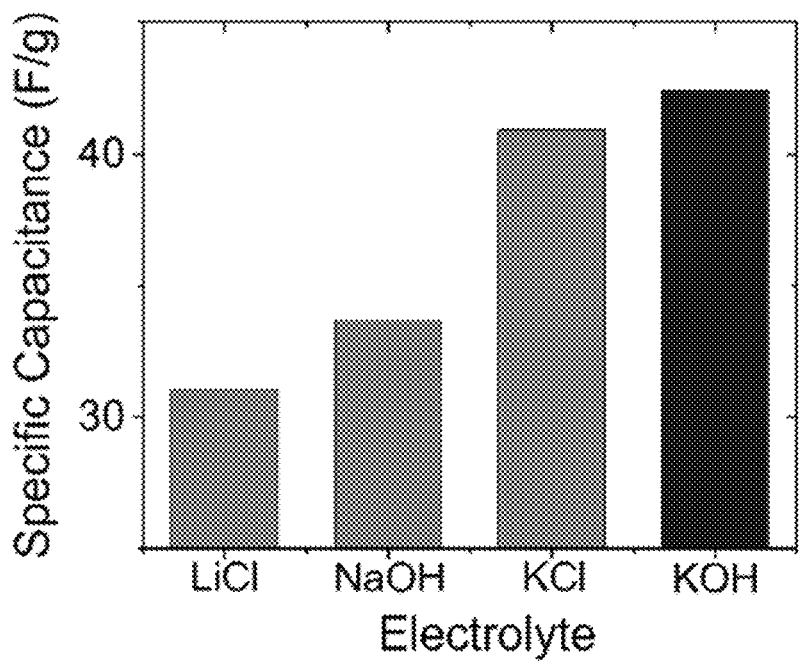
FIG. 3B graphically represents electrolyte tests comparing the performance of the electrode in 1 M of LiCl, NaOH, KCl, and KOH.

As the performance of a capacitor electrode can be affected by the interaction between the electrode and electrolyte, the CV response of the CNT-ZIF-$MoS_2$ electrode 30 was examined under different electrolytes, including LiCl, NaOH, KCl, and KOH, with the molarity of the electrolyte fixed at 1 M. As seen in FIG. 3B, KOH shows the highest specific capacitance, thus it is used for the rest of the study. The composite electrode in KOH and KCl demonstrated specific capacitances at around 42.4 and 41.0 F/g, respectively, while less than 33 F/g was recorded with other non-potassium electrolytes. The noticeable difference in the specific capacitance may have been associated with the radii and mobilities of cations. The hydrated radius was in the order of potassium ions<sodium ions<lithium ions. Thus, potassium ions should have a higher mobility than the other ions, resulting in a faster charge accumulation, and a greater amount of ion adsorption at the electrode surface. KOH showed a slightly higher specific capacitance than KCl. This was because OH— had a greater mobility than Cl—, leading to the higher conductivity of KOH at the same molarity. As a result, the composite electrode demonstrated the best charge storage properties with the KOH electrolyte.

Figure 3C:
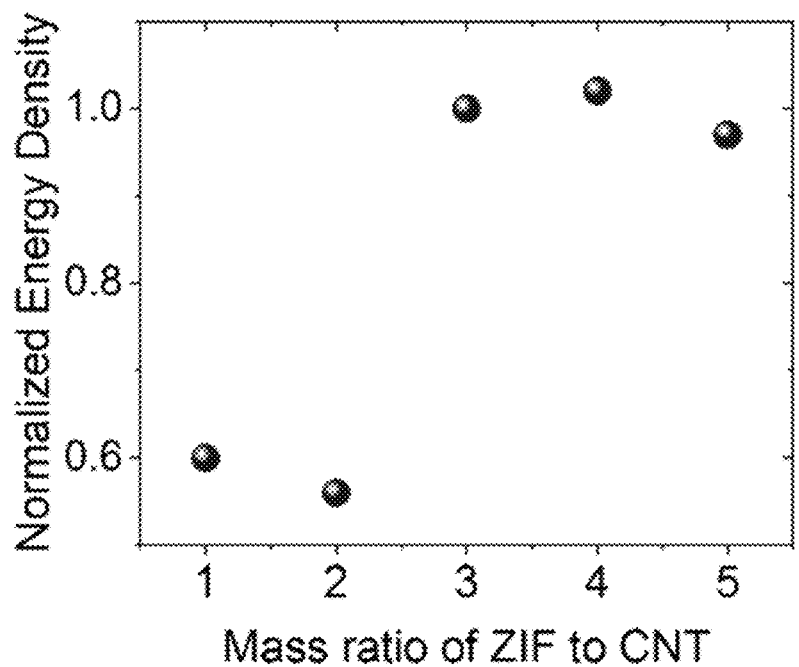
FIG. 3C represents energy densities of CNT-ZIF-MoS$_2$ as a function of ZIF to CNT mass ratios.
Figure 3D:
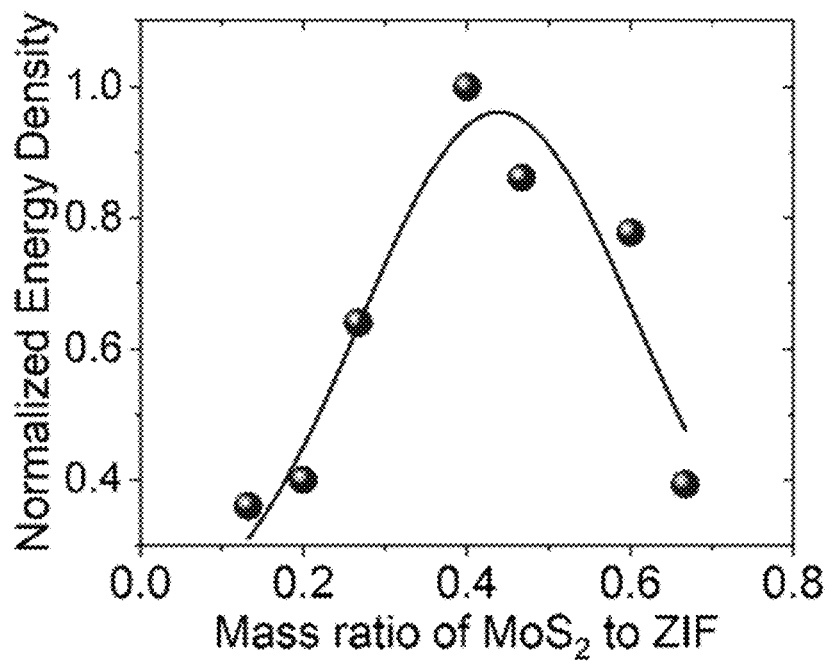
FIG. 3D graphically represents energy densities of CNT-ZIF-MoS$_2$ as a function of MoS$_2$ to ZIF mass ratios.

The mass ratio of the constituent materials was examined for optimal synthesis. FIG. 3C presents the normalized energy densities of CNT-ZIF-MoS$_2$ 10 for various ZIF to CNT ratios. The performance of the supercapacitor increased drastically at 3:1 (ZIF/CNT) and then leveled off. This suggested that the ZIF layer 16 may have coated CNT 14 sufficiently at a ratio of 3:1, and additional coating would not improve the energy storage performance. FIG. 3D presents the energy density as a function of MoS$_2$/ZIF. The maximum performance was found at roughly 0.4. The behavior may be understood based on the binding interaction between ZIF and MoS$_2$. When a small amount of MoS$_2$ flakes 24 was available, there were excess binding sites in the ZIF framework. Therefore, the performance improved with the addition of more MoS$_2$. The binding sites on ZIF was eventually saturated with MoS$_2$ flakes. Once the ZIF layer 16 was sufficiently covered by MoS$_2$ flakes 24, an additional supply may only lead to unbound and randomly floating MoS$_2$ flakes in the CNT-ZIF-MoS$_2$ solution. The excess flakes may aggregate and form an irregular mixture with CNT-ZIF, resulting in a reduction of the specific surface area and a deterioration in the charge storage. As seen in FIGS. 3C and 3D, the maximum energy density is found at the mass ratio of 3:1 for ZIF to CNT and 1:2.5 for MoS$_2$ to ZIF.

Figure 3E:
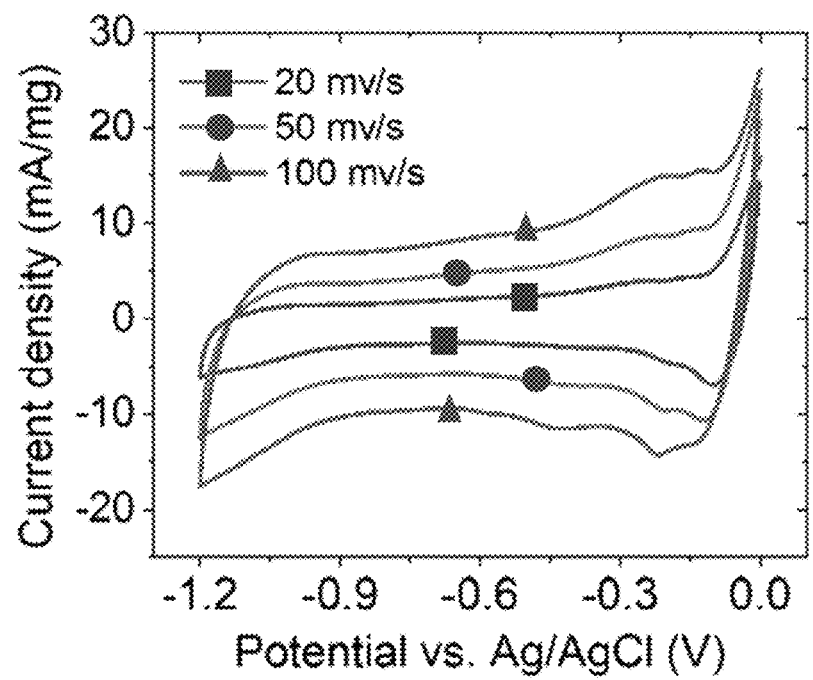
FIG. 3E graphically represents current-voltage responses of the CNT-ZIF-MoS$_2$ electrode at various scan rates.
Figure 3F:
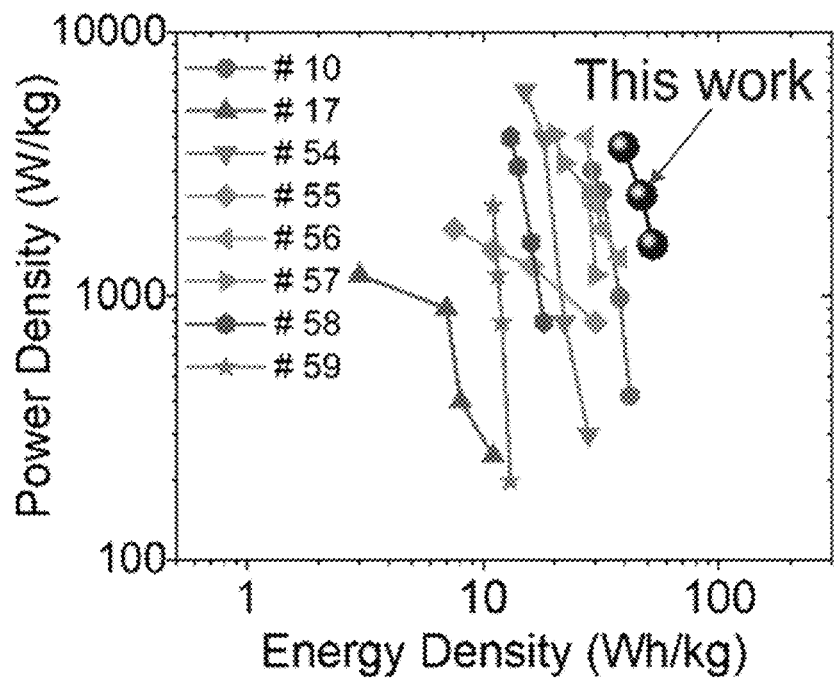
FIG. 3F is a Ragone chart showing the energy and power densities at different scan rates.

To understand the charging behavior, the CV measurement was performed at several different scan rates ranging from 20 to 100 mV/s. FIG. 3E shows that the current and the area of the CV curve increased with the scan rate. The semi-rectangular CV profile was maintained at all the scan rates examined, indicating the excellent rate capability of the electrode. The energy and power densities at each scan rate were estimated by equations (2) and (3). The electrode showed an energy density of approximately 52 Wh/kg at 20 m V/s and a power density of about 3680 W/kg at 100 mV/s. In FIG. 3F, the densities observed in this study are indicated as "this work," and the values reported in other studies are shown with different data markers. FIG. 3F shows that the power density increased with increasing scan rate, while the energy density exhibited the opposite trend, namely, the energy density decreased with increasing scan rate. The energy density of the ternary composite electrode was greater than those reported in many previous studies adopting CNT, ZIF, and/or MoS$_2$ as electrode materials.

Figure 4A:
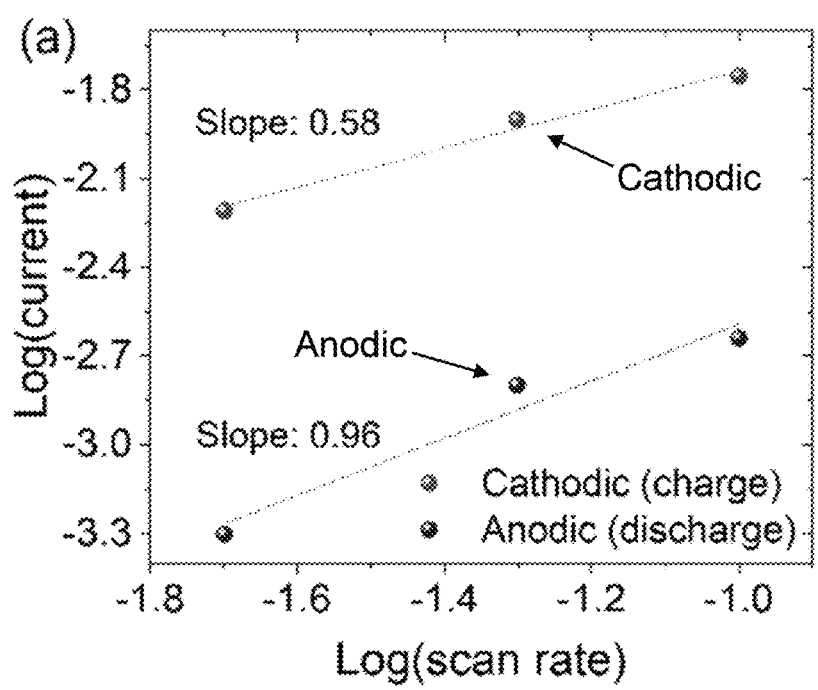
FIG. 4A graphically represents cathodic and anodic currents of the CNT-ZIF-MoS$_2$ electrode as a function of the scan rate from CV measurement.

Based on the CV responses at different scan rates, the charge storage mechanism of the electrode was analyzed based on the relation between the current (i) and scan rate (v) with the following power law equation:

$$i(V) = kv^b \qquad \text{Eq. (4)}$$

where V represents the fixed potential generating the current, k and b are adjustable parameters to fit the current as a function of scan rate v. Here, b-value measures the capacitive behavior. There are two theoretical ideal conditions: b=1.0 and 0.5. The former indicated the surface-controlled capacitive behavior which was typically observed with EDL-supercapacitors. In this case, the electrochemical current resulted from the adsorption/desorption of ions on the electrode surface. If the surface area expanded, more ions would be accumulated and the surface-controlled current would consequently increase. On the other hand, if the supercapacitor stored energy via faradaic reactions assisted by ion diffusion, the b-value was proportional to the square root of the scan rate. The b-value may be estimated by computing the slope of log (i) plot as a function of log (v). FIG. 4A shows such a log-log plot at a potential of −1.15 V during charge (cathodic) and discharge (anodic). The cathodic and anodic currents are measured, while the capacitor charges and discharges at −1.15 V of the applied potential, respectively. The cathodic b-value at the potential was approximately 0.67, indicating that the current may have predominantly originated from the faradaic reaction between potassium ions and the electrode. However, the b-value was about 0.96 during the discharge, suggesting that the surface-capacitive mechanism was predominant at the potential. The cathodic current has a smaller slope than the anodic current, suggesting a greater contribution of surface-controlled storage.

Figure 4B:
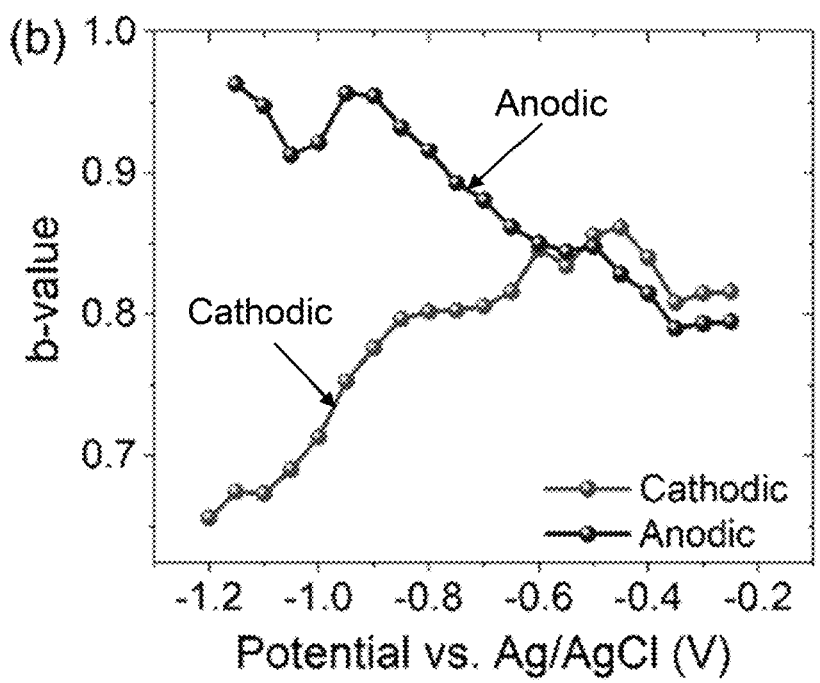
FIG. 4B graphically represents b-values for the CNT-ZIF-MoS$_2$ electrode at different applied potentials.
Figure 4C:
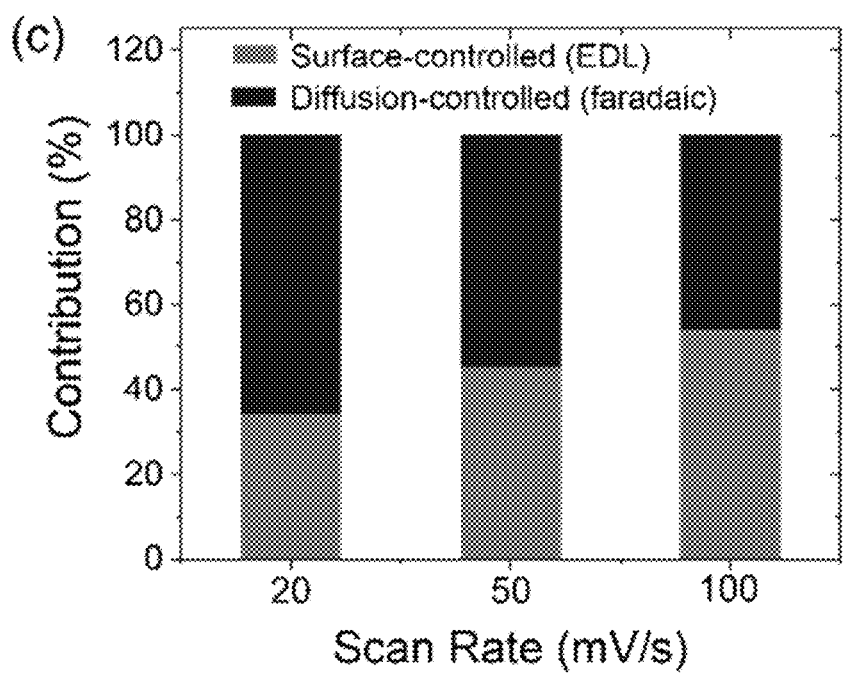
FIG. 4C graphically represents relative contributions of surface- and diffusion-controlled energy storage mechanisms at 20, 50, and 100 mV/s.

FIG. 4B presents b-values under various cathodic and anodic potentials. At −1.2 V, the b-value for the cathodic sweep is approximately 0.67, while that for the anodic process is about 0.95. Above −0.6 V, the b-values for both measurements are approximately 0.8. In the potential window from −0.3 to −0.6 V, the b-values varied from 0.80 to 0.85. Thus, the currents originated from both surface- and diffusion-controlled processes. During the charging process (red line, "cathodic"), the b-value sharply dropped from 0.8 at −0.85 V to 0.66 at −1.2 V, indicating a greater faradaic contribution. During the discharge (blue line, "anodic"), the b-values were about 0.94 in the potential range from −1.15 to −0.8 V. The CNT-ZIF-MoS$_2$ electrode may behave as an EDL-supercapacitor within this potential window. The relative contributions of the surface- and diffusion-controlled capacitance were also quantified. In FIG. 4C, the surface-controlled contribution was computed to be approximately 34, 45, and 54 percent for the scan rates of 20, 50, and 100 mV/s, respectively. This indicated that the double-layer capacitive contribution increased as the scan rate increased. In contrast, the contribution from the faradaic effects decreased. At a higher scan rate, the electrode demonstrates a greater contribution of the surface-controlled process. With a higher scan rate, a greater amount of ions may have quickly accumulated at the surface, thus increasing the surface-controlled contribution. The faradaic process required sufficient time to exchange reduced ions at the electrode with non-reduced ions in the bulk solution by diffusion such that the redox reaction was sustained. As the scan rate increases, the applied potential on the electrode will change swiftly, and the time for ion exchange will be shortened. As a result, the diffusion-controlled contribution may decrease with the rise of the scan rate.

Even at the high scan rate (100 mV/s), nearly half of the charge storage depended on the diffusion-controlled process in these investigations. It has been reported that the CNT- and MoS$_2$-based supercapacitors that do not have an intermediate ZIF layer mostly rely on the surface-controlled processes at high scan rates (e.g., above a few tens of mV/s).

For example, under a high scan rate (50 mV/s), N-doped CNT-carbon fiber network and $MoS_2$-graphene oxide (GO) electrodes have been demonstrated to have low diffusion-controlled faradaic contributions (less than 10%).

Figure 5:
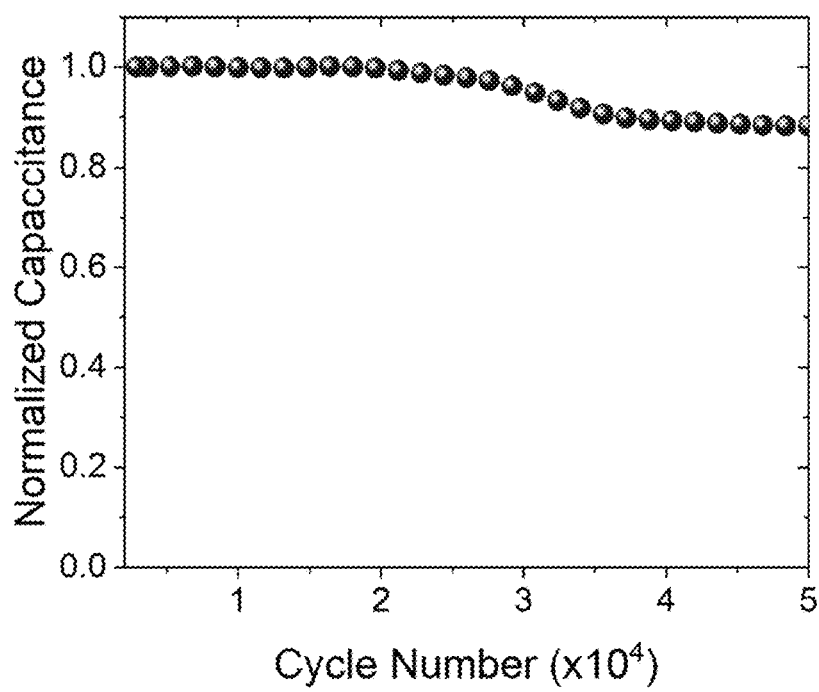
FIG. 5 represents durability of the CNT-ZIF-MoS$_2$ supercapacitor up to 50,000 cycles of charge and discharge.

Besides the high specific capacitance, energy, and power densities, the long charge-discharge stability of the device is another important parameter for practical applications. Therefore, the specific capacitance of CNT-ZIF-$MoS_2$ 10 was monitored while subjected to 50,000 consecutive charging and discharging cycles. The measurement was performed under the same potential window at the scan rate of 500 m V/s. FIG. 5 shows that the supercapacitor of the present invention showed an exceptionally stable charge-discharge behavior with approximately 99% of the initial specific capacitance after 20,000 cycles. The electrode was measured with a three-electrode system in a 1 M KOH electrolyte for a potential window from 0 to −1.2 V at 500 mV/s. As seen in FIG. 5, the supercapacitor demonstrated almost identical specific capacitance after 20,000 cycles. Approximately 95 and 90% of the original specific capacitance was retained after 30,000 and 50,000 cycles. It is believed that such a performance has not been achieved in most carbon-, TMD-, and ZIF-based devices. The difference may be attributed to the stable chemistry between the constituent materials. Furthermore, the electrode 30 retained over 95% of the original value after 30,000 cycles and demonstrates about 90% after 50,000 cycles. There were not any sudden shifts observed in the CV responses during the cyclic measurements with the Ag/AgCl reference electrode, which indicated stable measurement conditions. The outstanding stability of the electrode may allow for a long-term usage.

Figure 6:
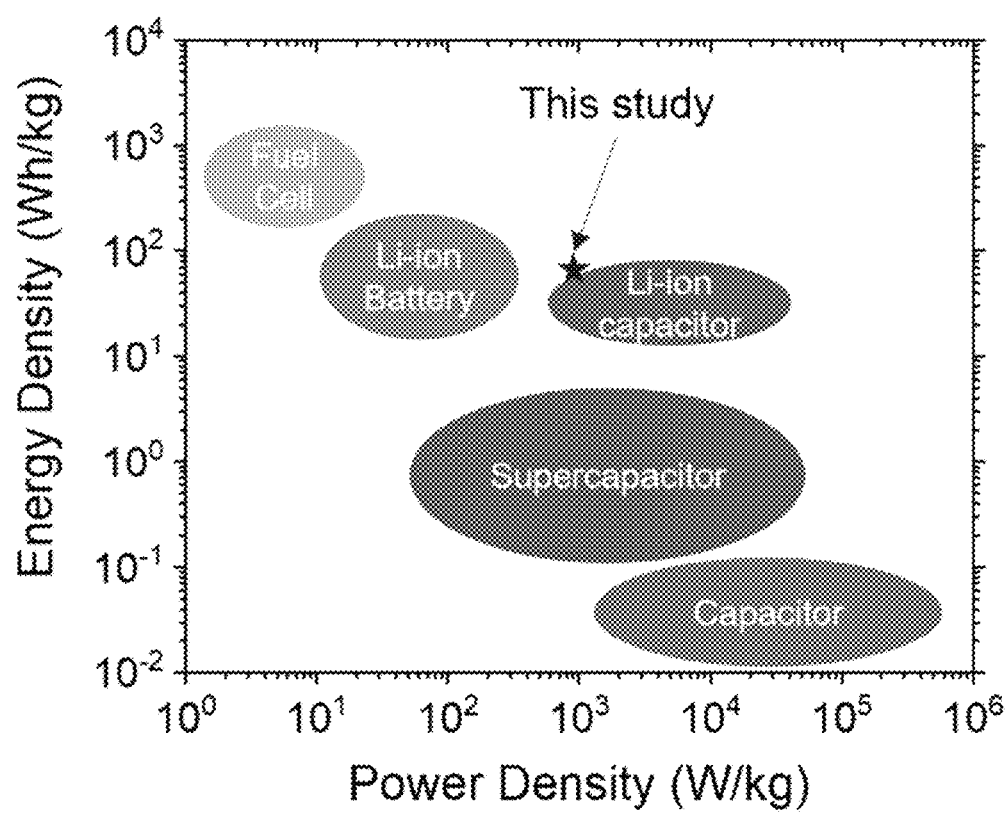
FIG. 6 is a Ragone chart showing the energy and power densities of the CNT-ZIF-MoS$_2$ supercapacitor, compared with other energy storage technologies.

FIG. 6 visually summarizes the performance of the ternary composite electrode 30 as it was compared to other energy storage devices in relation to energy and power densities. As seen in FIG. 6, the energy density of the CNT-ZIF-$MoS_2$ electrode was significantly higher than conventional supercapacitors and similar to those of Li-ion capacitors and batteries. The energy density of the CNT-ZIF-$MoS_2$ composite 10 (indicated as a star marked "this study") was determined to be superior to commercial devices and other existing supercapacitors. It was evident that the hybrid supercapacitors with hetero-materials may fill the gap in the energy density between the battery and the capacitor. FIG. 6 illustrates that the performance of the ternary composite electrode 30 of the present invention was comparable with that of Li-ion capacitors. The Lit capacitors store the electrochemical energy via faradaic processes with a high conductive cathode and a Li-storing anode. The faradaic reaction enables a relatively higher energy density than typical supercapacitors. However, the Li-ion capacitors often show poorer stability than the supercapacitors due to the irreversibility in faradaic reactions. It was concluded that the CNT-ZIF-$MoS_2$ materials 10 of the present invention could be the basis for a new supercapacitor with high power and energy densities along with excellent durability.

This disclosure describes a class of composite supercapacitor electrodes 10 capable of exceptional energy densities (for example, up to about 52.4 Wh/kg) and specific capacitance (for example, up to about 262 F/g), while maintaining remarkable durability and power densities (for example, up to about 1570 W/kg) at 20 mV/s. These supercapacitors thus are highly competitive and superior to other previously known supercapacitors, owing to the synergetic effects of the ternary composite. This approach may be further explored to design extreme energy storage devices. For example, $MoS_2$ with sulfur vacancies may be prepared by solvothermal synthesis methods, to yield more binding sites at the $MoS_2$ layer. The amount of sulfur vacancies in $MoS_2$ flakes may be adjusted by varying the concentration of the sulfur sources. As $MoS_2$ plates behave as an ion capturing material, the CNT-ZIF integrated with vacancy-rich $MoS_2$ may exhibit a higher energy density. Adjusting the porosity of ZIF crystals may also be achieved by modulating the size and the distribution of pores. In addition, the carbon framework may be doped with hetero-atoms such as N, S, and P to bear additional faradaic reactivity on the electrodes.

As previously noted above, though the foregoing detailed description describes certain aspects of one or more particular embodiments of the invention and investigations associated with the invention, alternatives could be adopted by one skilled in the art. For example, the ternary composite material could be used in various types of supercapacitors and/or other devices, process parameters such as temperatures and durations could be modified, and appropriate materials could be substituted for those noted. As such, and again as was previously noted, it should be understood that the invention is not necessarily limited to any embodiment described herein. It should also be understood that the phraseology and terminology employed above are for the purpose of describing the disclosed embodiments and investigations, and do not necessarily serve as limitations to the scope of the invention.

The invention claimed is:

1. A ternary composite material comprising:
   a scaffold formed of carbon nanotubes (CNT);
   a first layer of zeolitic imidazolate 8 (ZIF-8) crystals formed on the scaffold of the CNT; and
   a second layer of molybdenum disulfide ($MoS_2$) flakes formed on the first layer of the ZIF-8 crystals,
   wherein the ZIF-8 crystals are thiolated, and
   wherein sulfur vacancies of the $MoS_2$ flakes are bound to thiol group binding sites of the ZIF-8 crystals.

2. A supercapacitor comprising an electrode at least partly formed of the ternary composite material of claim 1.

3. The supercapacitor of claim 2, wherein the electrode has a specific capacitance of about 262 F/g.

4. The supercapacitor of claim 3, wherein the electrode retains at least 90 percent of the specific capacitance over 50,000 cycles.

5. The supercapacitor of claim 2, wherein the electrode has an energy density of about 52.4 Wh/kg measured at a scan rate of 20 mV/s.

6. The supercapacitor of claim 2, wherein the electrode has a power density of about 3680 W/kg under 100 mV/s.

7. The supercapacitor of claim 2, wherein the electrode has energy storage mechanisms comprising a surface-controlled capacitive process and a diffusion-controlled redox process with nearly equal contributions at a scan rate of 100 mV/s.

8. A method of producing an electrode of the supercapacitor of claim 2, the method comprising:
   producing a thin film of the ternary composite material;
   depositing the thin film on a substrate with a conductive epoxy thereon; and
   curing the conductive epoxy, thereby securing the thin film on the substrate.

9. The method of claim 8, wherein producing the thin film comprises:
   vacuum-filtrating a solution comprising the ternary composite material on a porous polytetrafluoroethylene (PTFE) membrane such that the solution diffuses through the membrane while the ternary composite material remains on the membrane and forms the thin film.

10. The method of claim 9, further comprising:
washing the thin film with ethanol and water; and
heating the thin film for a period of time sufficient to remove impurities therefrom.

11. The method of claim 8, wherein the ternary composite material is produced by a method comprising:
providing the CNT;
synthesizing the first layer of the ZIF-8 crystals on the CNT to form a binary composite material; and
reacting the binary composite material with the $MoS_2$ flakes to form the ternary composite material.

12. The method of claim 11, wherein the CNT are prepared by a high-pressure, gas-phase decomposition of CO (HiPco) process.

13. The method of claim 11, wherein providing the CNT comprises reacting the CNT and dopamine hydrochloride to form CNT-dopamine complexes.

14. The method of claim 13, wherein the synthesizing the first layer of the ZIF-8 crystals on the CNT comprises:
combining the CNT-dopamine complexes, dimethylformamide (DMF), zinc chloride, and 1h-1,2,4-triazole-3-thiol in a mixture; and
heating the mixture for a time sufficient to form the first layer of the ZIF-8 crystals on the CNT.

15. The method of claim 11, wherein the $MoS_2$ flakes are produced by sonicating bulk $MoS_2$ crystals in DMF.

16. A method of producing the ternary composite material of claim 1, the method comprising:
providing the CNT;
synthesizing the first layer of the ZIF-8 crystals on the CNT to form a binary composite material; and
reacting the binary composite material with the $MoS_2$ flakes to form the ternary composite material.

17. The method of claim 16, wherein the CNT are prepared by a high-pressure, gas-phase decomposition of CO (HiPco) process.

18. The method of claim 16, wherein providing the CNT comprises reacting the CNT and dopamine hydrochloride to form CNT-dopamine complexes.

19. The method of claim 18, wherein the synthesizing the first layer of the ZIF-8 crystals on the CNT comprises:
combining the CNT-dopamine complexes, dimethylformamide (DMF), zinc chloride, and 1h-1,2,4-triazole-3-thiol in a mixture; and
heating the mixture for a time sufficient to form the first layer of the ZIF-8 crystals on the CNT.

20. The method of claim 16, wherein the $MoS_2$ flakes are produced by sonicating bulk $MoS_2$ crystals in DMF.

* * * * *